(12) United States Patent
Nelson et al.

(10) Patent No.: US 9,896,308 B2
(45) Date of Patent: Feb. 20, 2018

(54) ELECTRIC HYDRAULIC CATALYST LOADING AND UNLOADING DEVICE AND METHODS THEREFOR

(71) Applicants: Norman D Nelson, Akron, OH (US); Adam N DePizzo, Akron, OH (US); Walter L Calhoun, Chagrin Falls, OH (US)

(72) Inventors: Norman D Nelson, Akron, OH (US); Adam N DePizzo, Akron, OH (US); Walter L Calhoun, Chagrin Falls, OH (US)

(73) Assignee: THE BABCOCK & WILCOX COMPANY, Barberton, OH (US)

( * ) Notice: Subject to any disclaimer, the term of this patent is extended or adjusted under 35 U.S.C. 154(b) by 639 days.

(21) Appl. No.: 14/506,923

(22) Filed: Oct. 6, 2014

(65) Prior Publication Data

US 2015/0098772 A1    Apr. 9, 2015

Related U.S. Application Data

(60) Provisional application No. 61/887,645, filed on Oct. 7, 2013.

(51) Int. Cl.
| | |
|---|---|
| B23P 11/00 | (2006.01) |
| B66B 15/08 | (2006.01) |
| B66B 11/00 | (2006.01) |
| B66F 9/06 | (2006.01) |
| B01D 53/86 | (2006.01) |

(52) U.S. Cl.
CPC .......... *B66B 15/08* (2013.01); *B01D 53/8631* (2013.01); *B66B 11/0005* (2013.01); *B66F 9/06* (2013.01)

(58) Field of Classification Search
CPC ... B23Q 1/03; B23Q 1/25; B23Q 1/28; B23Q 3/00; B23Q 3/06; B23Q 3/154
See application file for complete search history.

(56) References Cited

U.S. PATENT DOCUMENTS 5,725,205 A * 3/1998 O'Berg ................ B25H 1/00
                                                          269/289 R
5,791,034 A * 8/1998 Verret ................. G09F 15/0025
                                                          108/69

(Continued)

*Primary Examiner* — Lee D Wilson
(74) *Attorney, Agent, or Firm* — Michael J. Seymour

(57) ABSTRACT

An overhead catalyst loading device eliminates the need for lower flanges of the overhead catalyst structural support frame or dedicated overhead trolley beams to prevent ash build up collecting on a selective catalytic reactor (SCR) reactor box and provides an advantageous electric hydraulic lifting mechanism suitable for integration into a SCR device. The overall width of the SCR device is reduced since the structural support frame in the SCR device fits in the gaps between catalyst blocks. The overhead electric hydraulic catalyst loading device also minimizes the chance of injury during catalyst block installation by using an electric hydraulic actuated lifting mechanism consisting of spacers and structural telescopic members which may comprise holes and pins for height adjustment to allow for loading and unloading catalyst blocks into and out of a SCR device. Methods of lifting and loading and unloading a catalyst block are also presented therein.

18 Claims, 12 Drawing Sheets

(56) References Cited

U.S. PATENT DOCUMENTS

| | | | | |
|---|---|---|---|---|
| 6,113,088 A | * | 9/2000 | Gakhar | B25B 5/105 269/139 |
| 7,448,606 B1 | * | 11/2008 | Johnson | B05B 13/0285 269/16 |
| 2014/0227073 A1 | | 7/2014 | Nelson et al. | |

* cited by examiner

SECTION 3 - 3
PRIOR ART

ELECTRIC HYDRAULIC CATALYST LOADING AND UNLOADING DEVICE AND METHODS THEREFOR

This application claims priority to U.S. Provisional Patent Application Ser. No. 61/887,645 filed Oct. 7, 2013 and titled "Electric Hydraulic Catalyst Loading and Unloading Device and Methods Therefor." The compete text and disclosure of this patent application is hereby incorporated by reference as through fully set forth herein in its entirety.

BACKGROUND

The present invention generally relates to a selective catalytic reduction (SCR) device for converting $NO_x$ in the gas stream into $H_2O$ and $N_2$. More particularly, the present invention is directed to a catalyst loading device for loading and unloading catalyst blocks in an SCR device, and methods therefor.

SCR devices using catalyst blocks are often used in applications where $NO_x$ removal from flue gases is needed. In such cases, the SCR catalyst blocks are placed within the SCR reactor through which the combustion flue gases are conveyed. FIG. 1 shows a perspective view of an SCR reactor box (or SCR device) with fully and partially loaded catalyst block sections. There is an entrance for the catalyst loading device to enter for loading and unloading the catalyst blocks. The entrance and height between layers of catalyst is such that it allows enough space for the catalyst loading device (with or without a catalyst block) and the operator to enter the SCR device for loading and unloading the catalyst blocks. As shown in FIG. 1, the height between layers of catalyst layers is very limited, ranging anywhere from 10 to 12 feet high. As the available space between the top of the catalyst block and overhead obstructions (e.g., piping, sonic horns, sootblowers, etc.) is minimal, there is only room for the catalyst loading device structure, and no room for lifting machinery.

In order to remain effective, the catalyst should be protected from accumulation of particulate contaminants, which may deposit on the catalyst or otherwise restrict gas flow to and/or through the catalyst. Also catalyst is deactivated over time by the NOx removal process. In either case, removal and replacement or reloading of a catalyst block may be periodically required.

Existing industry solutions include a commercial walk behind fork lift on heavy duty pertinent grating, expanding hydraulic carts running on a secondary grid below the catalyst blocks, or multiple overhead trolley beam and hoists.

Typically, catalyst loading devices used in the industry run on the lower flanges of the overhead catalyst structural support frame or dedicated overhead trolley beams. This means that the shapes of the catalyst supporting beams are typically constructed of overhead trolley beams with flanges. These flanges continue to be a problem since they can collect ash which can fall off and are a starting place for catalyst pluggage.

Catalyst loading device structural support frames that require lifting from underneath the catalyst blocks continue to be a problem since they must be wider than the catalyst blocks, requiring extra space on one side of the block for the structural support frame and lifting mechanism, which also increases the overall width of the catalyst reactor box.

One method of loading and unloading catalyst blocks in a SCR device typically uses walk behind forklifts to move the catalyst blocks into the approximate location and then moves them into final placement with pry bars, which may increase the chance of personal injury.

United States Patent Application Publication Number US 2014/0227073 to Nelson et al. is drawn to an overhead catalyst loading device that eliminates the need for lower flanges of the overhead catalyst structural support frame or dedicated overhead trolley beams to prevent ash build up collecting on a SCR reactor box and provides an advantageous lifting mechanism suitable for integration into a SCR device. Nelson et al. uses a hydraulic pump to provide pressure to a lifting mechanism to engage a lifting frame of a lifting structure, and the force exerted by the lifting mechanism is transmitted into the lifting structure, causing it to be displaced vertically, thereby lifting the catalyst block coupled thereto. See FIGS. 2 and 3 for drawings of the prior art catalyst loading device.

It would be desirable to provide a catalyst loading device that eliminates the need for overhead trolley beams with ledges in the form of the support beam flanges to prevent ash build up collecting on the SCR reactor box and provides an advantageous electric hydraulic lifting mechanism suitable for integration into the SCR unit that minimizes the chance of injury, lessens the exertion of operator energy, and increases the speed and rate of loading and unloading catalyst blocks in the SCR device, which remains of significant commercial interest in the industry.

BRIEF DESCRIPTION OF INVENTION

The present invention is directed to an electric hydraulic catalyst loading device and a method for loading and unloading catalyst blocks in a selective catalytic reduction (SCR) device.

In accordance with one embodiment of the present invention, an overhead catalyst loading device eliminates the need for lower flanges of the overhead catalyst structural support frame or dedicated overhead trolley beams to prevent ash build up from collecting on the SCR reactor box and provides an electric hydraulic advantageous lifting mechanism suitable for integration into the SCR device. The catalyst loading device and lifting mechanism can be designed to straddle the catalyst blocks in either their width (short) or length (long) dimension based on the requirements of the SCR device and equipment or component arrangement. Furthermore, it also minimizes the chance of injury during catalyst block installation by using an electric hydraulic actuated lifting mechanism for loading and unloading the catalyst blocks into the SCR device.

The problem of ash collection on the flanges of overhead trolley beams which can fall off and be a starting place for catalyst pluggage is solved by an overhead catalyst loading device that eliminates the need for overhead trolley beams with ledges in the form of the support beam flanges to prevent ash build up from collecting on the SCR reactor box.

The problem of requiring extra space on one side of the catalyst blocks within the SCR reactor box for the structural support frame and lifting mechanism is solved by the fact that the structural support frame in the SCR device for the catalyst loading device is required to be no wider than the catalyst blocks. Therefore, no extra space is required on either side of the catalyst blocks for the cart support frame and the overall width of the SCR device is reduced. When temporary grating is supplied for personnel safety only one piece grating the size of the catalyst block needs to be removed during installation of the catalyst block.

The problem of using pry bars for final placement of catalyst blocks during loading and unloading that increases the chance of personal injury is solved by using an electric hydraulic actuated lifting mechanism for loading and unloading the catalyst blocks into the SCR device.

The problem of using a hand/foot hydraulic pump requiring operators to exert a great amount of energy to operate the lifting mechanism and decreasing the rate of loading and unloading of the catalyst blocks is solved by the use of an electric hydraulic operated lifting mechanism.

The catalyst loading device is advantageously constructed of conventional steel or other suitable material structural members (e.g., angles, C-sections, I-beams, T-beams, box sections, tubular members, bar or flat stock, hexagonal sections, octagonal sections, etc., but not limited thereto) to reduce costs.

The catalyst loading device comprises a lower support frame, wherein vertically oriented structural members are attached to a horizontal oriented lower support member. The structural members function as lower legs preferably constructed of tubular members or bar stock movably inserted into upper legs preferably constructed of tubular members of the upper lifting frame to adjust the height of the upper lifting frame for moving the catalyst loading device to a different grade or catalyst block layer in the SCR device or to transport the catalyst loading device to storage via inserting pins through holes in the structural members or legs at a desired height. A horizontally oriented lower support member is located between the lower legs and connected thereto on each end thereof. The lower support member provides extra support during loading and unloading of the catalyst blocks. Furthermore, the lower support member also provides mounting support for the hydraulic cylinder and rotatable wheels. Rotatable wheels are attached to the lower support member to enhance maneuverability within the SCR device and may include a lock therewith to prevent movement of the catalyst loading device during loading and unloading of the catalyst block. The rotatable wheels allow for the elimination of all overhead trolley beams inside the reactor box. The catalyst loading device moves into place via rotatable wheels in guide tracks on the top flange surface of the structural support frame (not shown) straddling catalyst blocks. The catalyst loading device can be rolled 90 degrees to the loading path into the SCR device and also moved 90 degrees sideways over to the next loading path.

An upper lifting frame is movably engaged with respect to the lower support frame. The upper lifting frame comprises horizontal oriented structural members preferably attached to vertically oriented tubular structural members together to form a rectangular or square shaped lifting frame with the tubular structural members extending from the horizontal oriented structural members. Furthermore, lifting lugs are attached to the front-side or back-side of the upper lifting frame for coupling the catalyst blocks thereto for loading and unloading the blocks in the SCR device. In another embodiment, lifting lugs may also be assembled at other locations of the upper lifting frame (e.g., towards a first-end and/or a second-end of the lifting structure, but not limited thereto). A horizontally oriented upper support member is located between the structural members or upper legs and connected thereto on each end thereof. The upper support member provides extra support during loading and unloading of the catalyst blocks. Furthermore, the upper support member also provides a mounting support for the spacer. The upper lifting frame further comprises other structural members, including, but not limited to, angles and flat stock (or plate), for support bracing for lifting catalyst blocks and mounting other structural members, a battery, a hydraulic pump, and motor, but not limited thereto.

Accordingly, one aspect of the present invention is drawn to a catalyst loading device, comprising: at least one lower support frame; an upper lifting frame movably engaged with respect to the lower support frame; and means for coupling catalyst blocks to the upper lifting frame. The means for coupling the catalyst to the lifting structure includes lifting lugs, pins, fasteners, bolts, or any suitable device known to one skilled in the art, but not limited thereto.

The upper lifting frame or lower lifting frame may comprise a lifting mechanism for loading and unloading the catalyst blocks into a SCR device. Accordingly, another aspect of the present invention is drawn to a lifting mechanism, comprising: at least one hydraulic pump; at least one vertically oriented hydraulic cylinder fluidically connected to the at least one hydraulic pump; at least one vertically oriented spacer attached to the at least one hydraulic cylinder; a power supply; and a motor attached to the hydraulic pump and wired to the power supply to operate the hydraulic pump. The spacer is interchangeable with various spacer designs or telescopic for height adjustment of the upper lifting frame based on the requirements of the SCR device and equipment or component arrangement. Alternatively, the hydraulic cylinder may be attached to the upper support member at the upper end of the spacer instead of the lower support member at the bottom of the spacer. The power supply may be a battery or electrical connection to a power source (e.g., 110 volt electrical outlet) and the motor may be electrically driven.

To allow for height adjustment of the upper lifting frame of the catalyst loading device for different sizes and heights of catalyst blocks, the spacer may be assembled in one of the following ways, but not limited thereto. In one embodiment, as at least one spacer that is rigidly connected to the at least one hydraulic cylinder and is interchangeable for different sizes and heights of catalyst blocks. As used herein, rigidly connected elements move together as a unit. In another embodiment, as at least one spacer comprising telescoping structural members with holes and pins for height adjustment of the upper lifting frame of the catalyst loading device for different sizes and heights of catalyst blocks. Telescopic or telescoping as used herein refers to having or consisting of structural member sections designed to slide into one another and/or describes the movement of one structural member section sliding out from or into another structural member section from its initial state of position. These structural members may be tubular members, but not limited thereto.

The second adjustable spacer comprises at least one vertically oriented upper structural member rigidly connected to the upper support member and at least one other vertically oriented structural member attached to the at least one hydraulic cylinder connected to the lower support member. The lower structural member telescopically moves out from or into the upper structural member. Both structural members have at least one hole so that at least one pin can be inserted therethrough for adjusting the height of the upper lifting frame. During adjustment of the upper lifting frame, the upper structural member slides along the lower structural member vertically up or down until the upper lifting frame is at the desired height. Once the upper lifting frame is at the desired height, a pin is inserted through the hole to fix the adjustable spacer and upper lifting frame to the desired height. A hole is included in the upper support member to allow the lower structural member to slide therethrough during adjustment of the upper lifting frame to the desired height as shown in FIG. 10. Alternatively, the hydraulic cylinder may be attached to the upper support member at the upper end of the spacer instead of the lower support member at the bottom of the spacer. The vertically oriented tubular structural members or legs of the upper lifting frame and vertically oriented structural members or legs of the lower support frame are also telescopic so the lower support frame structural members can move out from or into the upper lifting frame structural members during height adjustment of the upper lifting frame. The lower support frame and upper lifting frame structural members may still comprise holes and pins for locking the upper lifting frame to a desired height for adjusting the height of the upper lifting frame for moving that catalyst loading device to a different grade or catalyst block layer in the SCR device or to transport the catalyst loading device to storage.

A switch may be assembled to the upper lifting frame or lower support frame and wired to the power supply and to the motor. The switch may be a manual push button switch with an up and down button that acts to transmit power from the power supply to drive the motor to operate the hydraulic pump. The switch will control the operation of the lifting mechanism to raise and lower the upper lifting frame.

There may be two hydraulic cylinders with spacers assembled thereto; one hydraulic cylinder and spacer located towards the first end of the catalyst loading device and the other hydraulic cylinder and spacer located towards the second end of the catalyst loading device; both hydraulic cylinders and spacers are assembled to the upper and lower support members and centered approximately between the two structural members or legs of the respective first and second end of the catalyst loading device.

The present invention facilitates movement of catalyst blocks in an SCR device. The catalyst loading device is maneuvered into place over the catalyst blocks and removably coupled to the catalyst blocks for loading and unloading of the blocks in an SCR device. The catalyst loading device moves into place via rotatable wheels in guide tracks on the top flange surface of the structural support frame (not shown) straddling catalyst blocks between the structural members or legs. The upper lifting frame is positioned to a desired height via one of the various spacer designs. Catalyst blocks are then coupled via lifting lugs on the catalyst loading device to the upper lifting frame.

Another aspect of the present invention is drawn to a method of lifting a catalyst block, wherein a hydraulic pump provides pressure to a hydraulic cylinder, wherein the application of force by the hydraulic cylinder displaces a spacer vertically, causing it to vertically raise the upper lifting frame attached thereto, thereby lifting the catalyst block coupled to the upper lifting frame. The hydraulic pump may be an electric or hand/foot hydraulic pump, but not limited thereto.

Once the catalyst blocks are moved into position in the SCR device, the pressure exerted by hydraulic pump may be released, permitting the hydraulic cylinders to retract. This lowers the spacer and the upper lifting frame attached thereto. Catalyst blocks are de-coupled from upper lifting frame once they are in a desired position. The catalyst loading device allows the catalyst blocks to be set directly in place without the use of a pry bar, thereby minimizing the chance of personal injury.

Accordingly, another aspect of the present invention is drawn to a method of loading and unloading a catalyst block into an SCR device, comprising the steps of: moving a catalyst loading device via wheels attached thereto in guide tracks over top of the catalyst block; positioning a upper lifting frame of the catalyst loading device to a desired height; coupling the catalyst block to the upper lifting frame of the catalyst loading device; operating a lifting mechanism causing force to be applied to displace a spacer vertically, causing it to vertically raise the upper lifting frame attached thereto, thereby lifting the catalyst block coupled to the upper lifting frame; moving the catalyst loading device into a desired position for loading or unloading the catalyst block; releasing pressure exerted by the lifting mechanism to lower the spacer and upper lifting frame attached thereto; decoupling the catalyst blocks from the catalyst loading device to allow the catalyst block to be placed at the desired position.

In another embodiment of the present invention, fasteners such as screws, bolts, keyed, pinned or splined connections, or other structures known to one of ordinary skill in the art may be used to construct the catalyst loading device.

In another embodiment of the present invention, welded connections or other structures and/or methods known to one of ordinary skill in the art may be used to construct the catalyst loading device In another embodiment of the present invention, the structural members and/or legs may be comprised of tubular or solid circular, square, or other shapes known to one of ordinary skill in the art.

In yet another embodiment of the present invention, the spacer(s) comprises telescoping structural members with holes and pins to allow for height adjustment of the upper lifting frame of the catalyst loading device for different sizes and heights of catalyst blocks.

In yet another embodiment of the present invention, the hydraulic cylinder may be attached to the upper support member instead of the lower support member.

In another embodiment, the hydraulic cylinders and spacers may be offset with respect to one another instead of directly opposite and in line with one another. For example, one hydraulic cylinder may be mounted towards the front side of the catalyst loading device, while the other is mounted towards the back side of the catalyst loading device.

In another embodiment, multiple lifting mechanisms may be employed; each comprising single or multiple sets of hydraulic cylinders and spacers.

In another embodiment, multiple power supplies may be employed to provide power and to drive multiple motors to operate single or multiple sets of hydraulic pumps.

The relevant portion(s) of any specifically referenced patent and/or published patent application is/are incorporated herein by reference in its entirety.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated. These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION OF INVENTION

Figure 1:
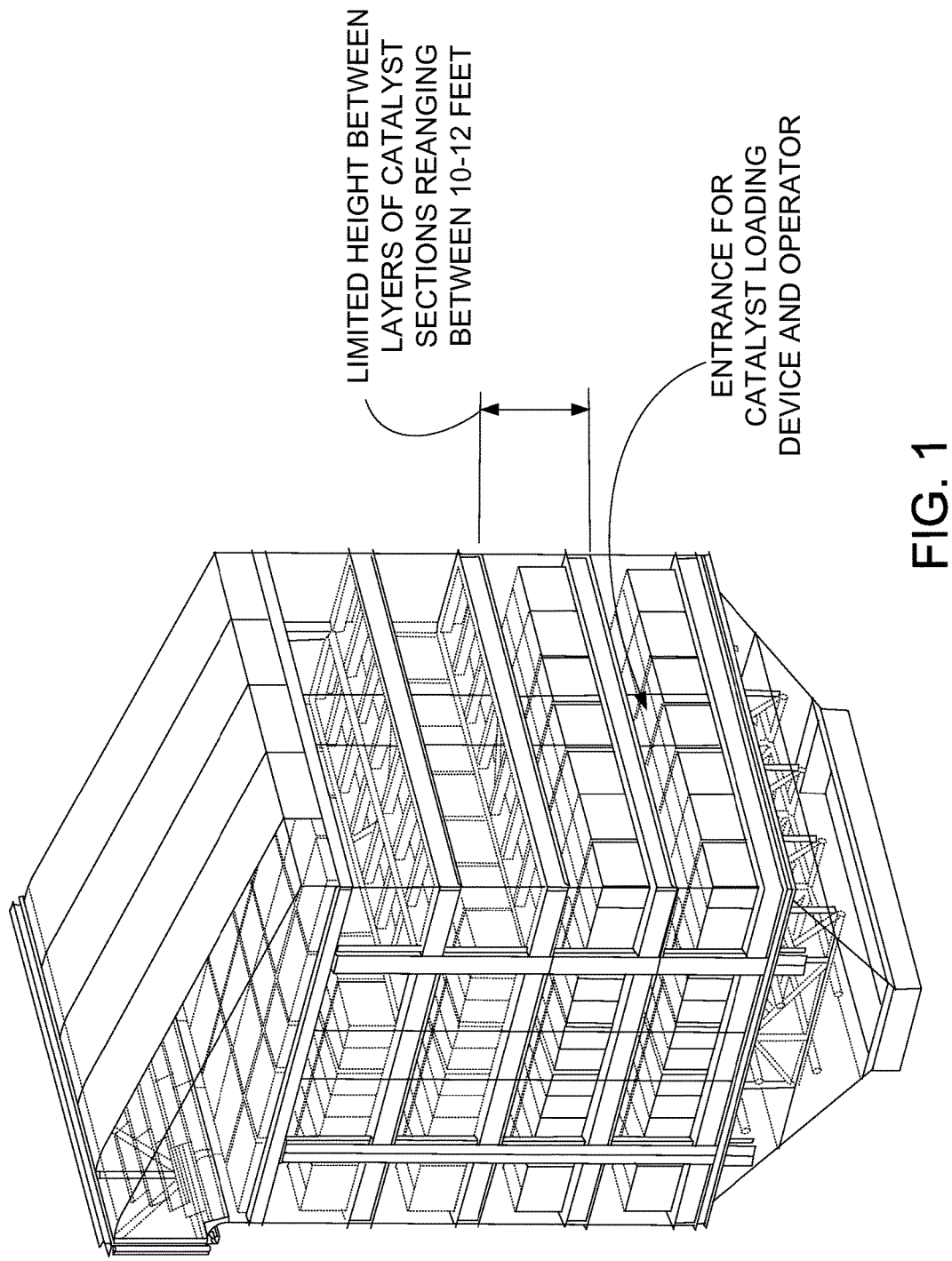
FIG. 1 illustrates a perspective view of an SCR reactor box or device showing the environment is limited by space constraints between catalyst sections for loading and unloading of catalyst blocks.
Figure 2:
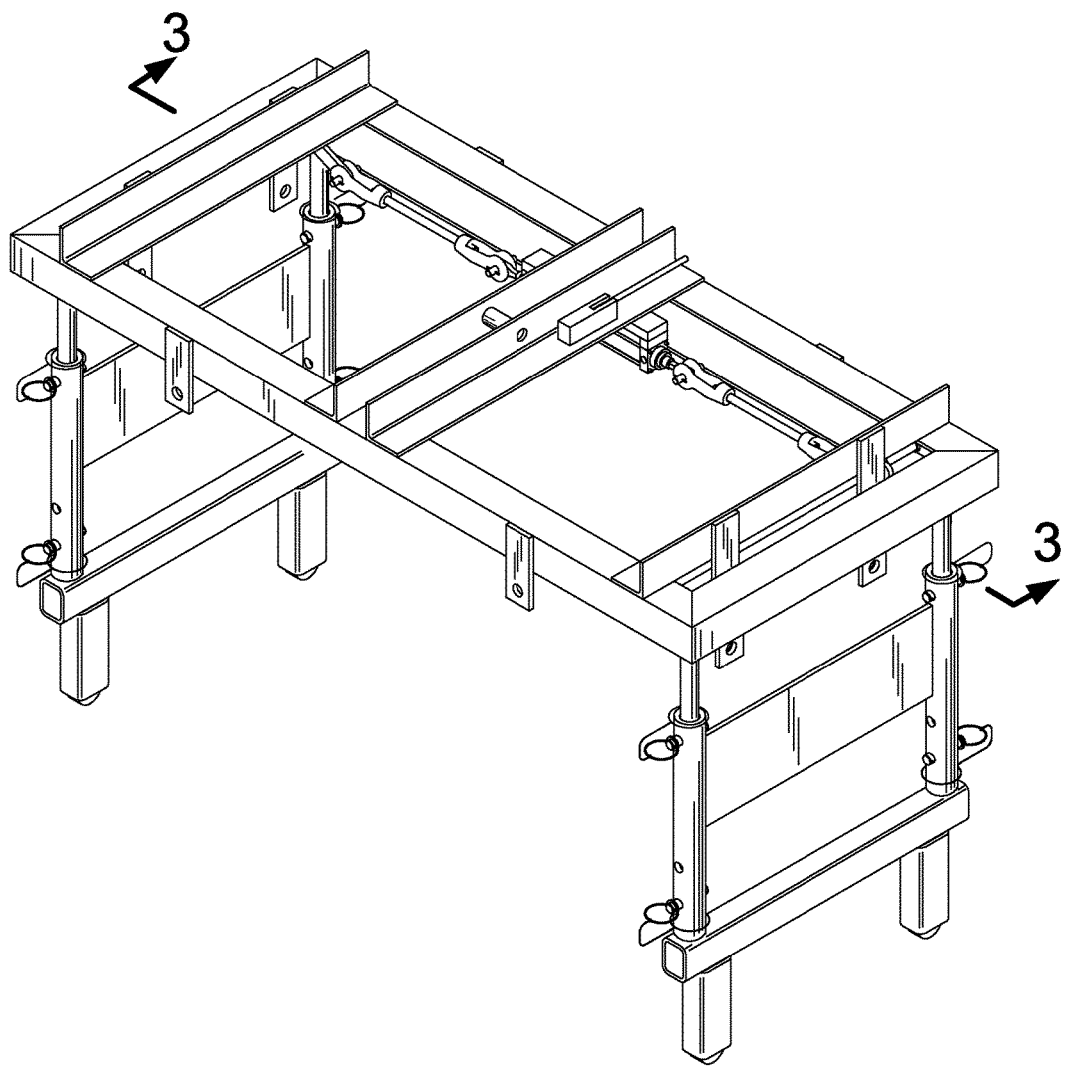
FIG. 2 illustrates a perspective view of one embodiment of a prior art version of a catalyst loading device.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

It should be noted that some terms used herein are relative terms. For example, the terms "front", "back", "first", "second" are relative to the view shown in the figure, and should not be construed as requiring a particular orientation or location of the structure. For example, although the lifting mechanism is depicted as being located towards the backside of the catalyst loading device, it may alternatively be located at the front side. Similarly, the terms "upper" and "lower" are relative to each other in location, i.e. an upper component is located at a higher elevation than a lower component. Furthermore, the terms "width", "length", "short", and "long" are relative to each other in size or measurement, i.e. width or short side is smaller in distance than a length or long side of a component.

The terms "vertical" or "vertically" and "horizontal" or "horizontally" are used to indicate direction relative to an absolute reference, i.e. ground level. However, these terms should not be construed to require structures to be absolutely parallel or absolutely perpendicular to each other. For example, a first vertical structure and a second vertical structure may not be necessarily parallel to each other.

To the extent that explanations of certain terminology or principles of the heat exchanger, boiler, and/or steam generator arts may be necessary to understand the present disclosure, and for a more complete discussion of catalyst-containing devices, SCRs, or of the design of modern utility and industrial boilers, the reader is referred to Steam/its generation and use, 41$^{st}$ Edition, Kitto and Stultz, Eds., Copyright© 2005, The Babcock & Wilcox Company, Barberton, Ohio, U.S.A., the text of which is hereby incorporated by reference as though fully set forth herein.

The present invention is directed to a catalyst loading device and methods for lifting and loading and unloading catalyst blocks in a SCR device. The present invention moves via rotatable wheels in guide tracks on the top flange surface of the structural support frame (not shown) that the catalyst blocks rest on inside the SCR device. Therefore, the shape of the structural support frame has no effect on the function of the catalyst loading device and fits in the gaps between catalyst blocks. The present invention eliminates the need for overhead trolley beams with ledges in the form of the support beam flanges that ash would otherwise collect on in the SCR reactor box. The ash collection in the SCR reactor is dramatically reduced, thus minimizing ash clumps from falling on the catalyst blocks and creating a starting spot for pluggage.

Since the structural support frame in the SCR device for the catalyst loading device fits in the gaps between the catalyst blocks, no extra space is required on either side of the catalyst blocks for the cart support frame and the overall width of the SCR device is reduced. Only one piece grating the size of the catalyst block needs to be removed during installation of the catalyst block. Permanent grating can be left in place for personal protection at all times without interfering with installation of the catalyst blocks or operation of the SCR device. Moreover, the catalyst loading device works equally well when only temporary grating is permitted to minimize ash buildup with fuels that readily adhere to one another. In this case, there is only one small opening in the grating at any time corresponding to the size of a catalyst block. Furthermore, the overall width of the SCR device is reduced.

Figure 4:
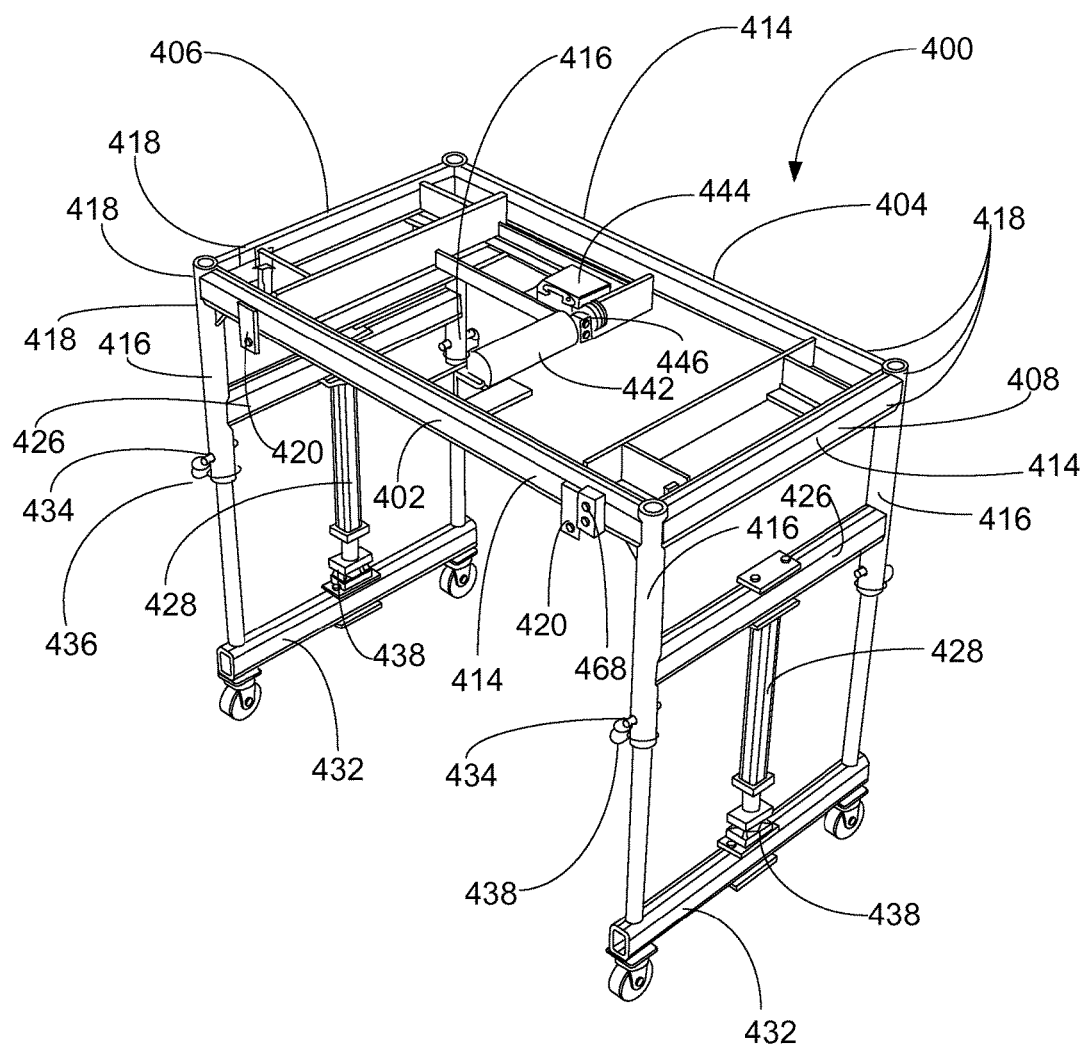
FIG. 4 illustrates a perspective view of one embodiment of the catalyst loading device of the present disclosure.

Referring to the drawings generally, wherein like reference numerals designate the same or functionally similar elements throughout the several drawings, and to FIG. 4 in particular, there is shown a perspective view of a first embodiment of a catalyst loading device, generally designated 400. The catalyst loading device has a front side 402 and a back side 404, and a first end 406 and a second end 408.

Figure 5:
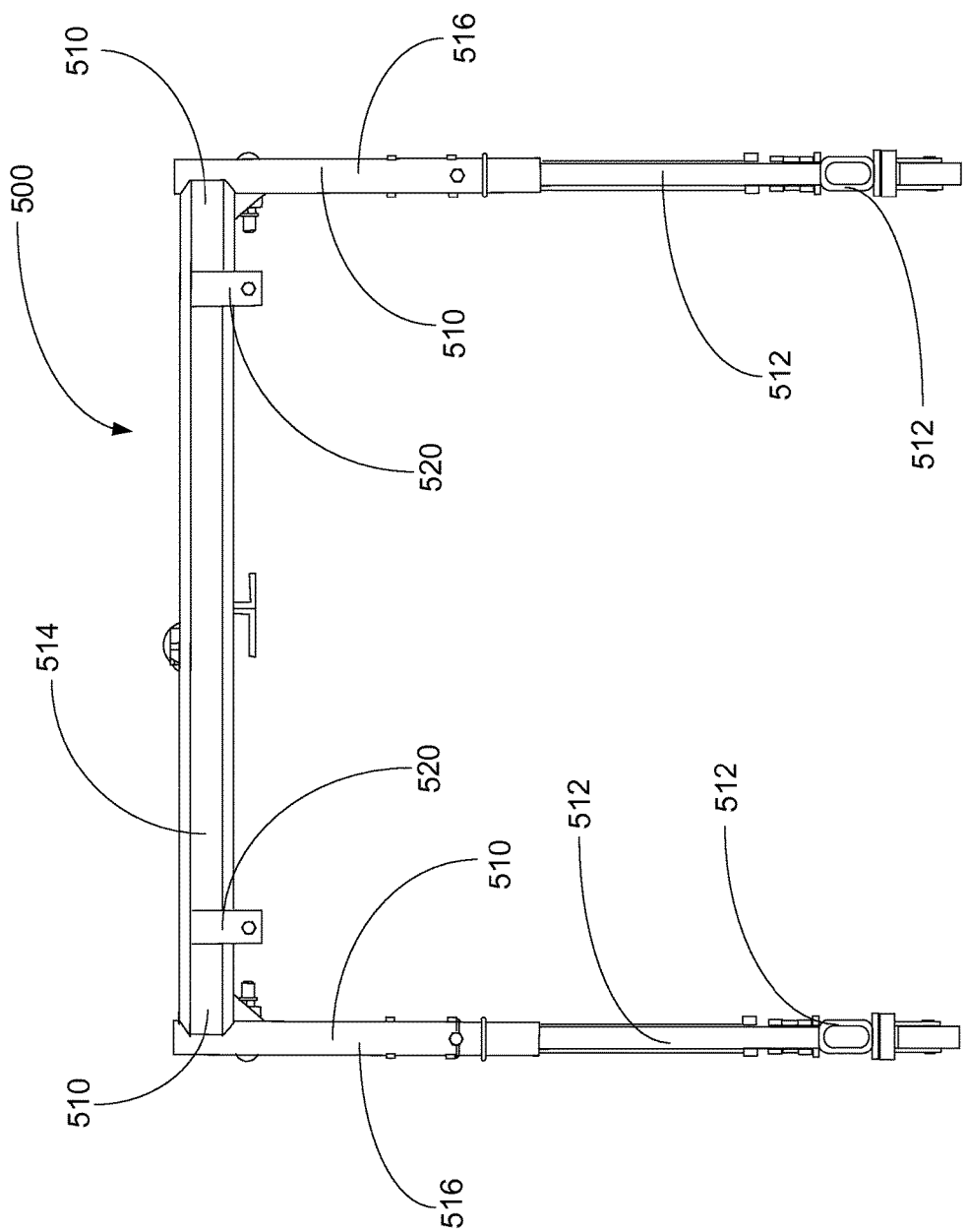
FIG. 5 illustrates a front view of one embodiment of the catalyst loading device of the present disclosure.

Referring to FIG. 5, there is illustrated a front view of the catalyst loading device generally designated 500 having a upper lifting frame 510 movably engaged with respect to a lower support frame 512.

Figure 3:
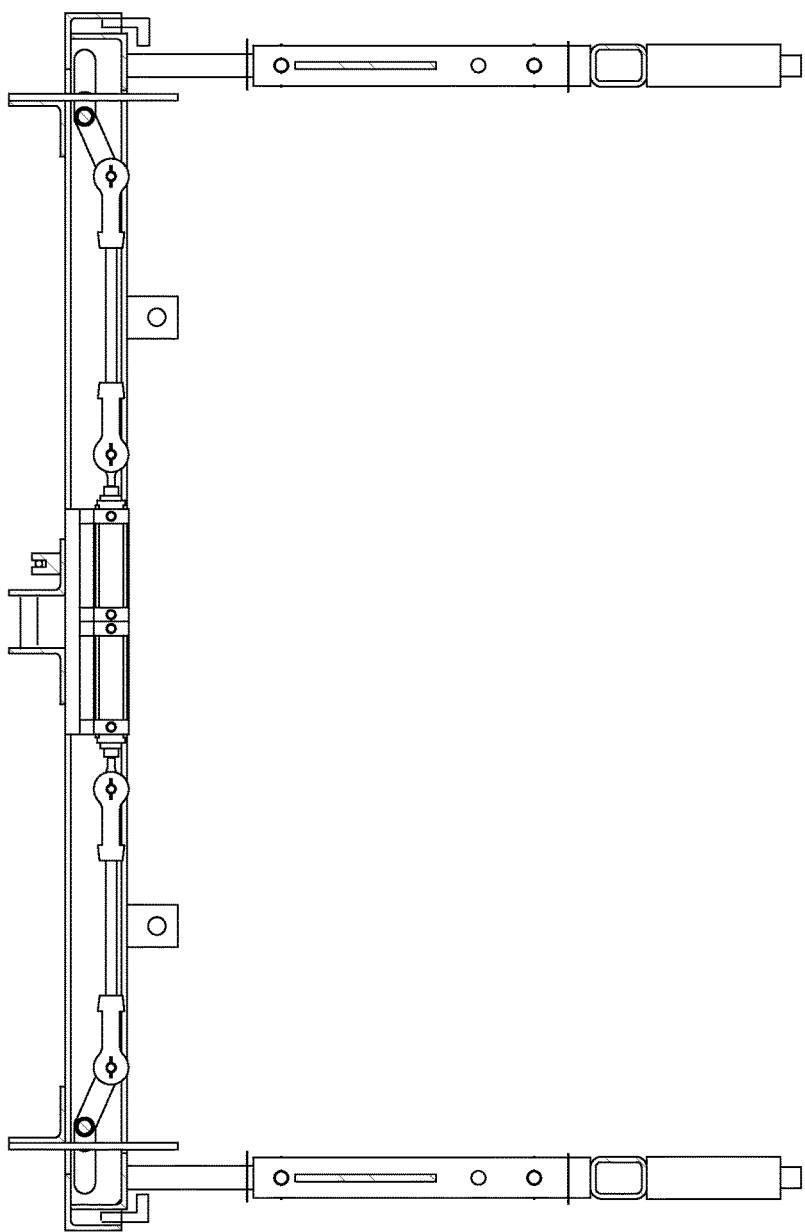
FIG. 3 illustrates a front section view of the one embodiment of a prior art version of the catalyst loading device of FIG. 2.
Figure 6:
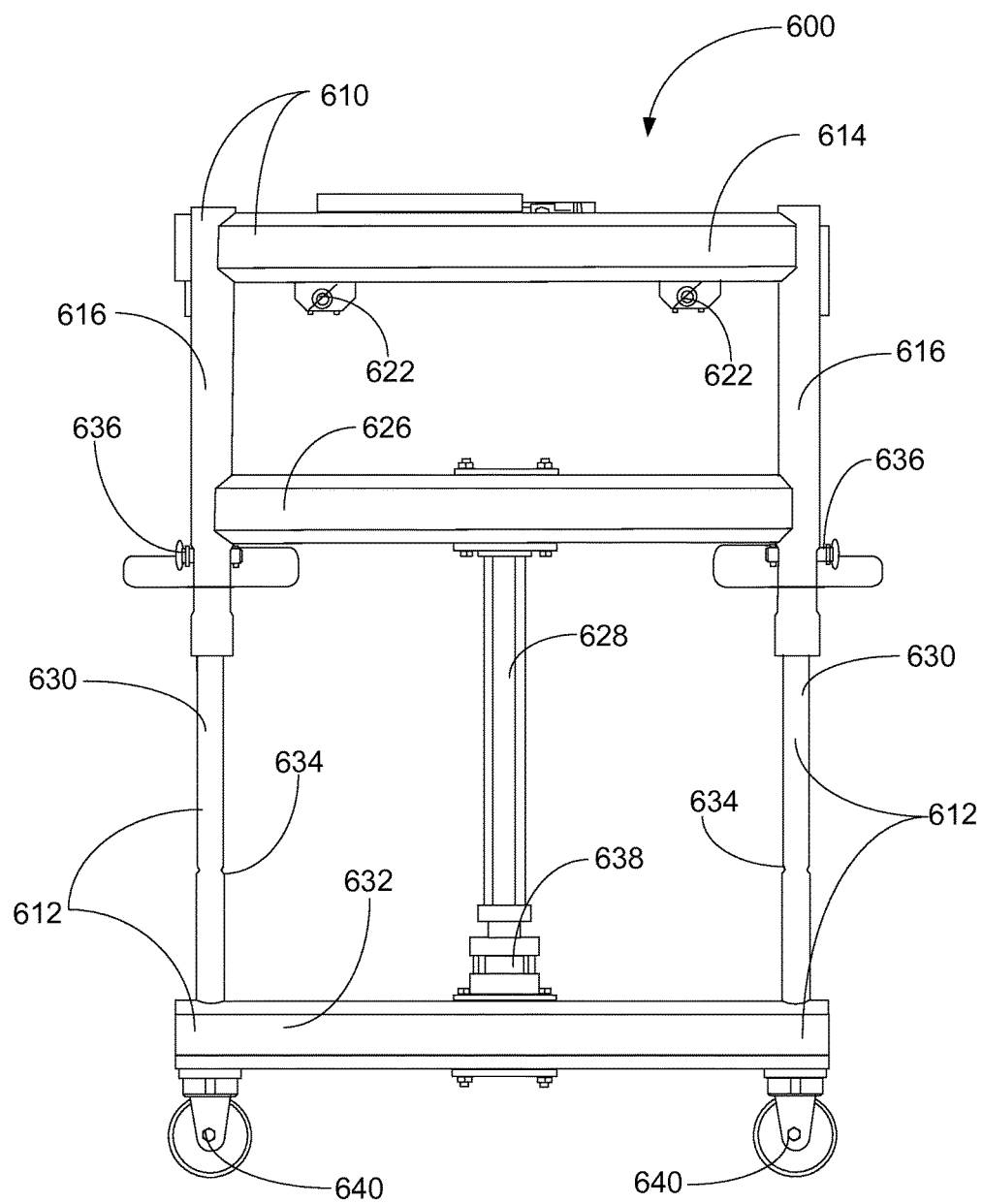
FIG. 6 illustrates a side view of one embodiment of the catalyst loading device of the present disclosure.
Figure 7:
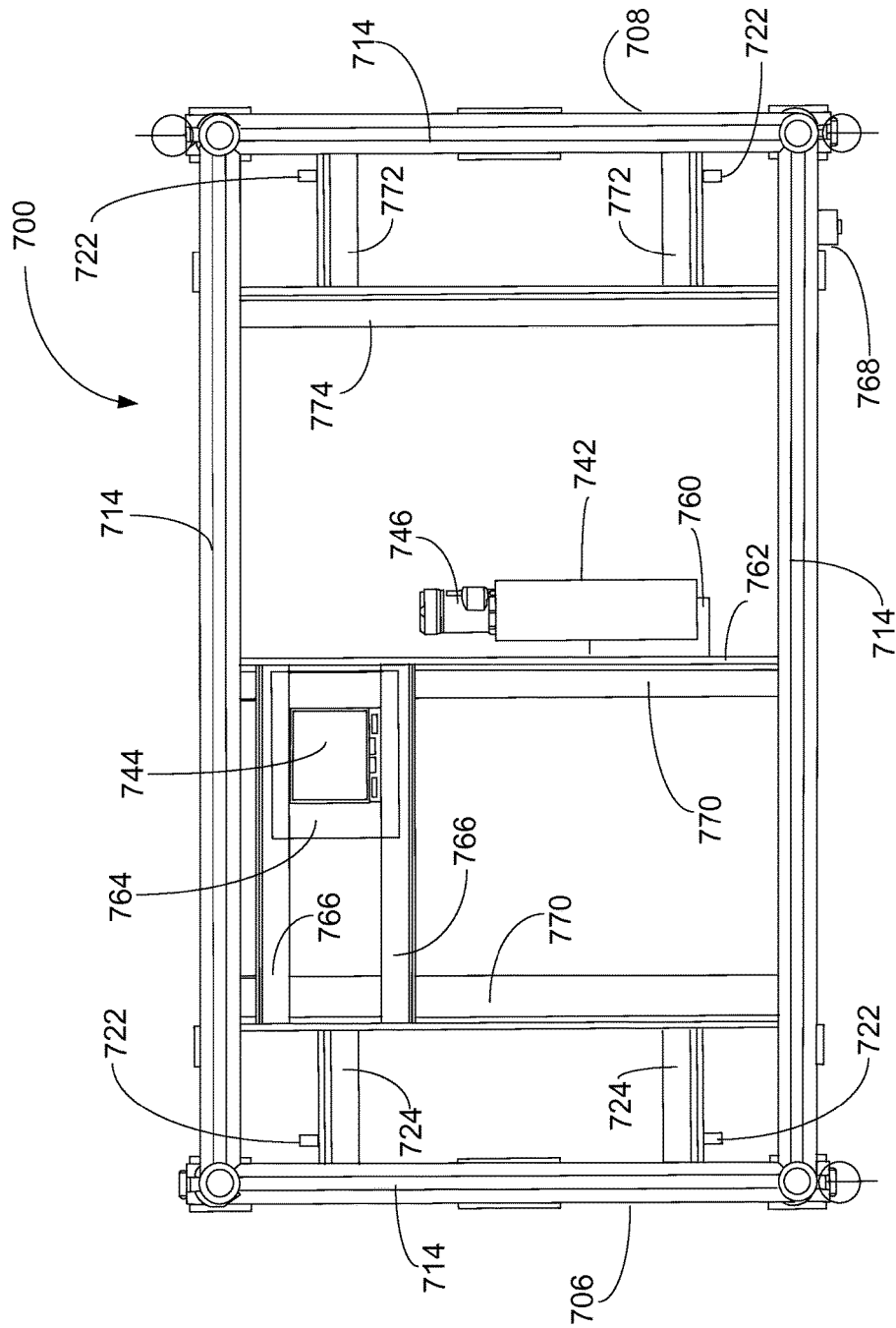
FIG. 7 illustrates a top plan view of one embodiment of the catalyst loading device of the present disclosure.

Referring to FIGS. 4 and 5, upper lifting frame 510 comprises horizontally oriented structural members 414, 514 preferably attached to vertically oriented tubular structural members or legs 416, 516 together to form a rectangular or square shaped lifting frame 418 with the tubular structural members extending from the horizontal oriented structural members. Lifting lugs 420, 520 are assembled to structural members 414, 514 at the front side and back side for coupling to the catalyst blocks 1199 (see also FIG. 11) for loading and unloading the catalyst blocks 1199 into and out of the SCR device. In another embodiment as shown in FIGS. 6 and 7, lifting lugs 622, 722 may also be assembled to structural members 724 towards the first end 706 and towards the second end 708 of the catalyst loading device 600, 700. Accordingly, in other embodiments, only lifting lugs 420, 520 may be assembled or only lifting lugs 622, 722 may be assembled to the catalyst loading device. Accordingly, in other embodiments, both lifting lugs 420, 520 and lifting lugs 622, 722 may be assembled to the catalyst loading device. In other embodiments of the invention, lifting lugs may be assembled at other various locations on the upper lifting frame and/or other structural members. Referring to FIG. 3, a horizontally oriented upper support member 626 is located between structural members 616 and connected thereto on each end thereof. The upper support member 626 provides extra support during loading and unloading of the catalyst blocks. Furthermore, the upper support member 626 also provides a mounting support for the spacer 628.

Referring to FIG. 6, a lower support frame 612 comprises vertically oriented structural members or legs 630 attached to a horizontal oriented lower support member 632. Structural members 630 are movably inserted into structural members 616 of the upper lifting frame 610. To adjust the height of the upper lifting frame 610 for moving the catalyst loading device to a different grade or catalyst block layer in the SCR device or to transport the catalyst loading device to storage, structural members 630 and 616 have holes 634, which together with pins 636, allow for positioning the height of the upper lifting frame 610 to a desired height. The pins 636 are inserted through holes 634 in structural members 630 and 616 once the structural members 616 are adjusted to the desired height for upper lifting frame 610. Referring back to FIG. 6, a horizontally oriented lower support member 632 is located between the structural members 630 and connected thereto on each end thereof. The lower support member 632 provides extra support during loading and unloading of the catalyst blocks. Furthermore, the lower support member 632 also provides a mounting support for the hydraulic cylinder 638 and rotatable wheels 640. The catalyst loading device moves into place via rotatable wheels 638 in guide tracks on the top flange surface of the structural support frame (not shown) straddling catalyst blocks between the structural members or legs. Rotatable wheels 640 are attached to the lower support member 632 to enhance maneuverability within the SCR device and may include a lock therewith to prevent movement of the catalyst loading device during loading and unloading of the catalyst block. The rotatable wheels 640 allow for the elimination of all overhead trolley beams inside the reactor box. The catalyst loading device 600 can be rolled 90 degrees to the loading path into the SCR device and also moved 90 degrees sideways over to the next loading path.

Referring to FIGS. 4 and 6, the catalyst loading device 400, 600 may comprise a lifting mechanism for loading and unloading the catalyst blocks into a SCR device. The lifting mechanism comprises at least one: hydraulic pump 442; at least one vertically oriented hydraulic cylinder 438, 638 fluidically connected to the hydraulic pump 442; vertically oriented spacer 428, 628 attached to the at least one hydraulic cylinder 438, 638; a power supply 444; and a motor 446 attached to the hydraulic pump 442 and wired to the power supply 444 to operate the hydraulic pump 442. Referring to FIG. 4, the hydraulic cylinders 438 are mounted to lower support member 432. Spacers 428 are mounted to the hydraulic cylinder at one end and mounted at the other end to upper support member 426. Alternatively, the hydraulic cylinder 438, 638 may be attached to the upper support member 426, 626 at the upper end of spacer 428, 628 instead of the lower support member 1432, 632 at the lower end of spacer 428, 628. The spacer 428, 628 is interchangeable with various spacer designs for height adjustment of the upper lifting frame 610 based on the requirements of the SCR device and equipment or component arrangement. The electric hydraulic lifting mechanism increases the rate that catalyst blocks can be loaded and unloaded into the SCR device, as well as, decreases the amount of energy exerted by the operators during operation of the lifting mechanism.

To allow for height adjustment of the upper lifting frame 610 of the catalyst loading device 400, 600 for different sizes and heights of catalyst blocks, spacer 428, 628 can be assembled one of the following ways, but not limited thereto. In one embodiment, as a spacer that is rigidly connected to the hydraulic cylinder and is interchangeable for different sizes and heights of catalyst blocks. As used herein, rigidly connected elements move together as a unit. In another embodiment, as telescoping structural members with holes and pins, similar to structural members 630 and 616 with holes 634 and pins 636, which are adjustable for different sizes and heights of catalyst blocks. These structural members may be tubular members, but not limited thereto.

Figure 8:
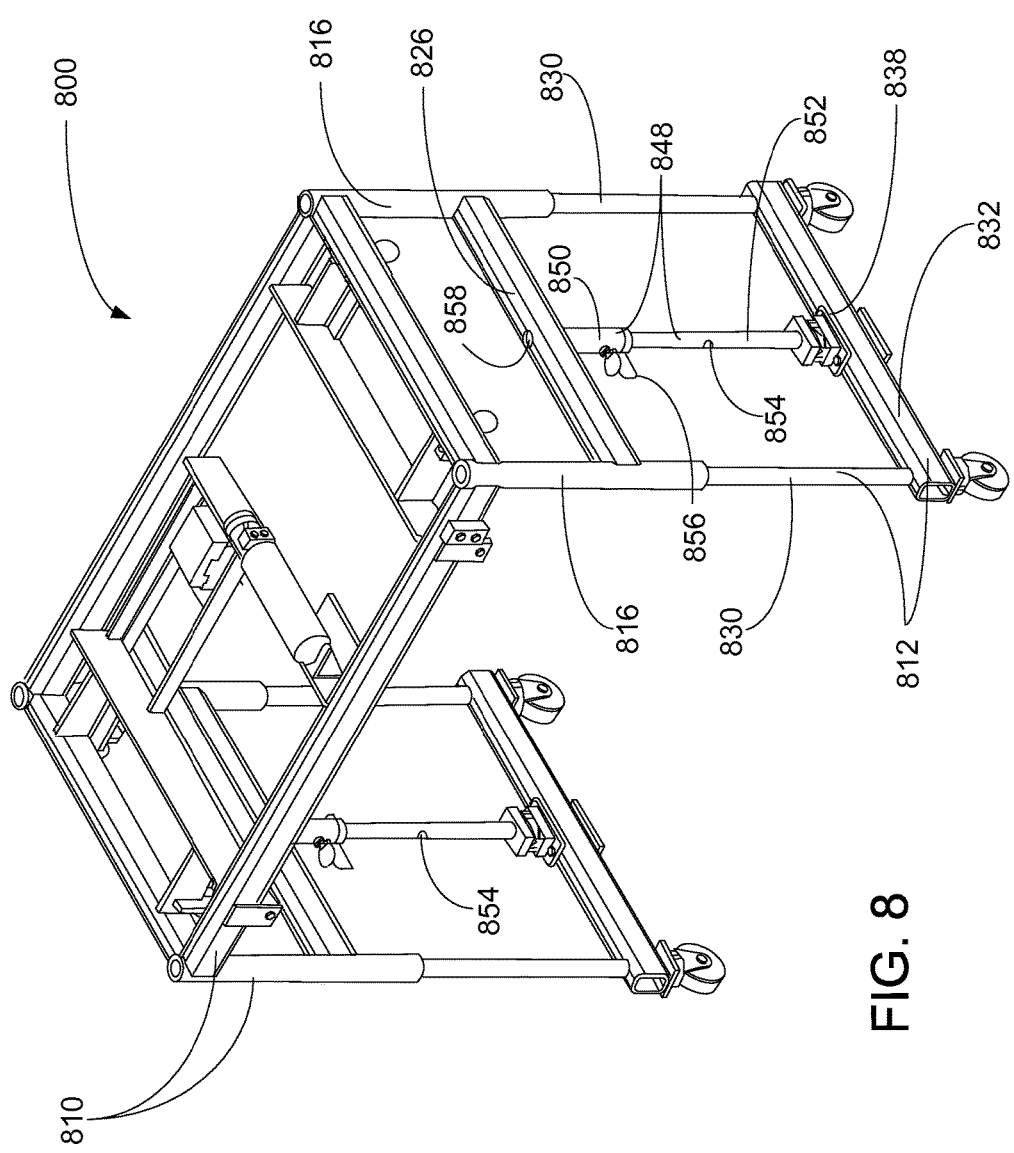
FIG. 8 illustrates a perspective view of one embodiment of the catalyst loading device of the present disclosure showing the spacer comprised of telescoping structural members with holes and pins.
Figure 9:
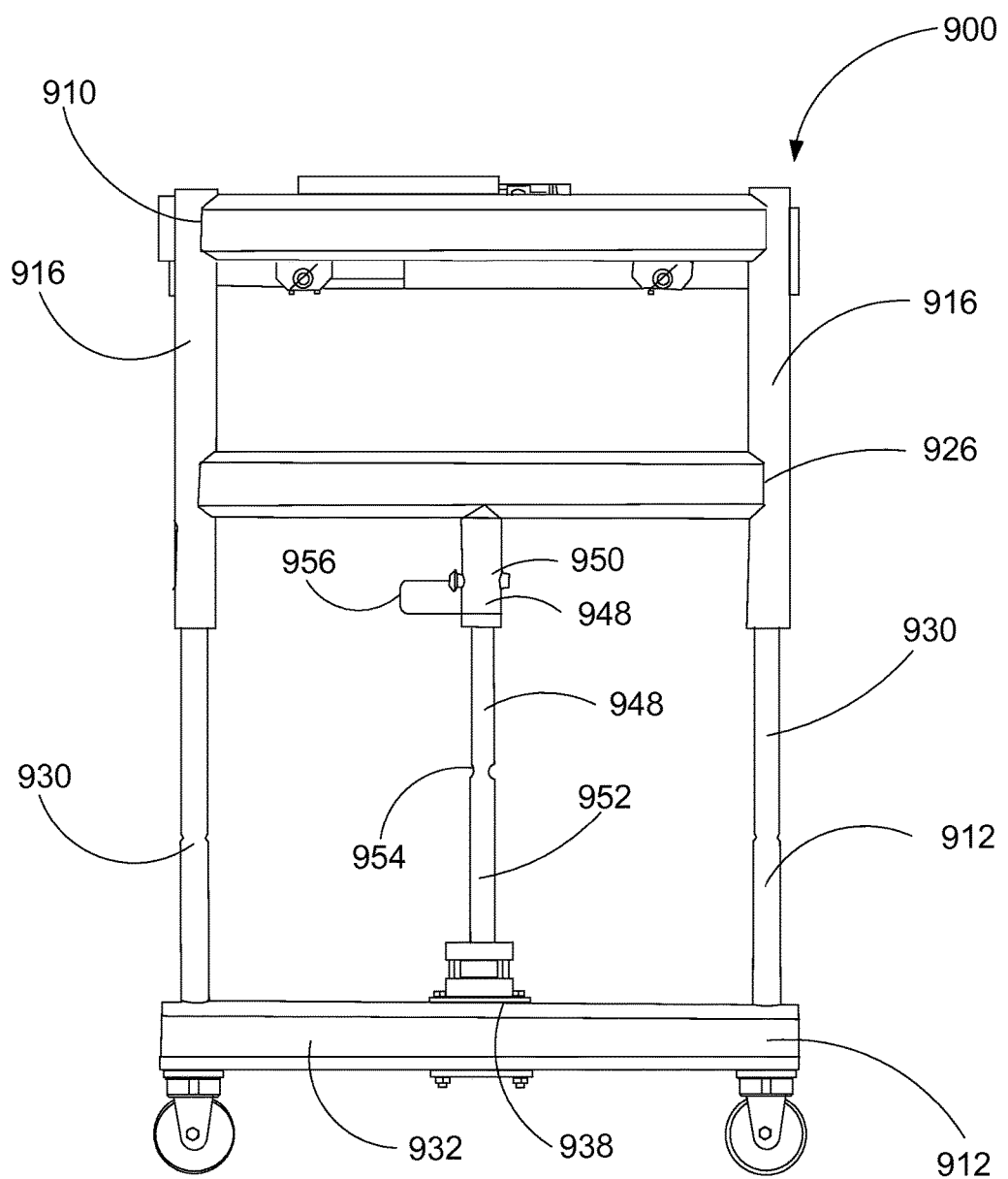
FIG. 9 illustrates a side view of one embodiment of the catalyst loading device of the present disclosure showing the spacer comprised of telescoping structural members with holes and pins.
Figure 10:
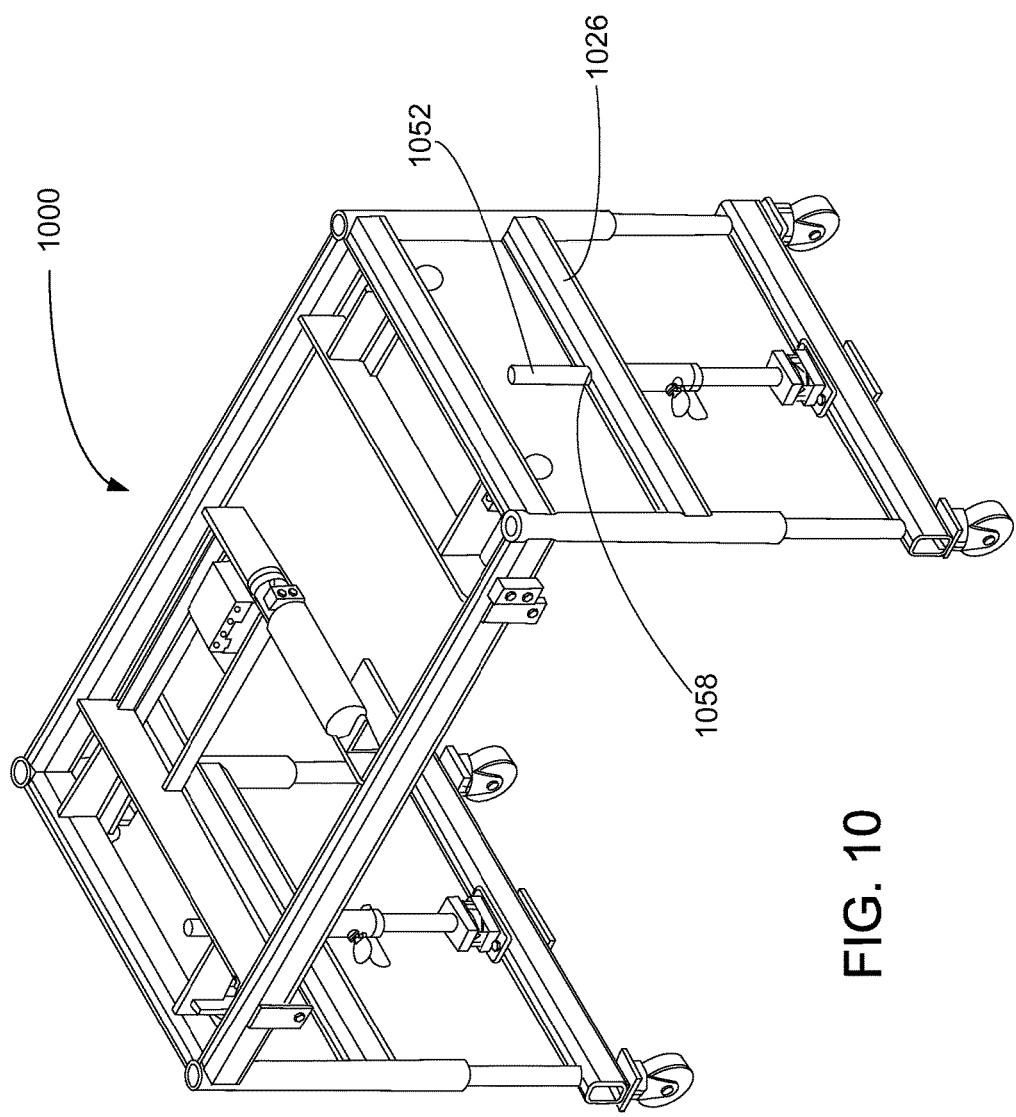
FIG. 10 illustrates a perspective view of one embodiment of the catalyst loading device of the present disclosure showing the spacer comprised of telescoping structural members with holes and pins while in the lowered position.

In yet another embodiment of the catalyst loading device 800, 900, 1000 includes a spacer 848, 948 comprising telescoping structural members 850, 852, 950, 952 with holes 854, 954 and pins 856, 956 as shown in FIGS. 8 through 10. The spacer 848, 948 comprises at least one vertically oriented upper structural member 850, 950 rigidly connected to the upper support member 826, 926 and at least one other vertically oriented lower structural member 852, 952 attached to the at least one hydraulic cylinder 838, 938 connected to the lower support member 832, 932. Alternatively, the hydraulic cylinder 838, 938 may be attached to the upper support member 826, 926 at the upper end of spacer 848, 948 instead of the lower support member 832, 932 at the lower end of spacer 848, 948. The lower structural member 852, 952 telescopically moves out from or into the upper structural member 850, 950. Both structural members have at least one hole 854, 954 so that at least one pin 856, 956 can be inserted therethrough for adjusting the height of the upper lifting frame 810, 910. During adjustment of the upper lifting frame 810, 910, the upper structural member 850, 950 slides along the lower structural member 850, 950 vertically up or down until the upper lifting frame 810, 910 is at the desired height. Once the upper lifting frame 810, 910 is at the desired height, a pin 856, 956 is inserted through the hole 854, 954 to fix the adjustable spacer 848, 948 and upper lifting frame 810, 910 to the desired height. A hole 1058 is included in the upper support member 1026 to allow the lower structural member 1052 to slide therethrough during adjustment of the upper lifting frame to the desired height as shown in FIG. 10. The vertically oriented tubular structural members or legs 816, 916 of the upper lifting frame 810, 910 and vertically oriented structural members or legs 930, 930 of the lower support frame 812, 912 are also telescopic so the lower support frame structural members can move out from or into the upper lifting frame structural members during height adjustment of the upper lifting frame. The lower support frame and upper lifting frame structural members may still comprise holes and pins for locking the upper lifting frame to a desired height for adjusting the height of the upper lifting frame for moving that catalyst loading device to a different grade or catalyst block layer in the SCR device or to transport the catalyst loading device to storage.

Referring to FIG. 7, hydraulic pump 742 is mounted to structural member 760 and/or structural member 762. Motor 746 is mounted to the hydraulic pump 742. Alternatively, motor 746 could be mounted also to a structural member such as 762 in addition to or independently of hydraulic pump 742. The power supply 744 is mounted on structural member 764 and/or structural members 766. The power supply 744 may be a battery or electrical connection to a power source (e.g., 110 volt electrical outlet) and the motor 746 may be electrically driven. Structural members 760, 762, 764, and 766 also provide stiffening and support for loading and unloading the catalyst blocks.

Referring also to FIG. 4, a switch 468, 768 may be assembled to the upper lifting frame and wired to the power supply 474, 744 and to the motor 446, 746. The switch may be a manual push button switch with an up and down button that acts to transmit power from the power supply to drive the motor to operate the hydraulic pump.

Referring to FIGS. 4 and 6, there may be two hydraulic cylinders 438, 638 with spacers 428, 628 assembled thereto; one hydraulic cylinder and spacer located towards the first end 406 and the other hydraulic cylinder and spacer located towards the second end 408 of the catalyst loading device 400, 600; both hydraulic cylinders and spacers assembled to the upper and lower support members 426, 626, 432, 632, respectively, and approximately centered between the two structural members 612, 630 of the respective first and second end 406, 408 of the catalyst loading device 400, 600. The word "center" or "centered" in this context refers to the relationship of the hydraulic cylinders 438, 638 and spacers 428, 628 relative to the symmetrical axis between the structural members 612, 630 in FIGS. 4 and 6, and not to a specific center point or location in space.

Referring to FIG. 7, in another embodiment of the present invention lifting lugs 722 may be attached to horizontally oriented structural member 724. Horizontally oriented structural members or cross members 770 are attached to structural members 714 to provide stiffening and support for loading and unloading catalyst blocks, as well as, mounting support for structural members 760, 762, 764, and 766 and hydraulic pump 742, motor 746, and power supply 744. Horizontally oriented structural members 772 are attached to structural member 411 at one end and attached to structural member 774 at the other end. Structural members 772 provide additional stiffening and support for loading and unloading catalyst blocks.

Figure 11:
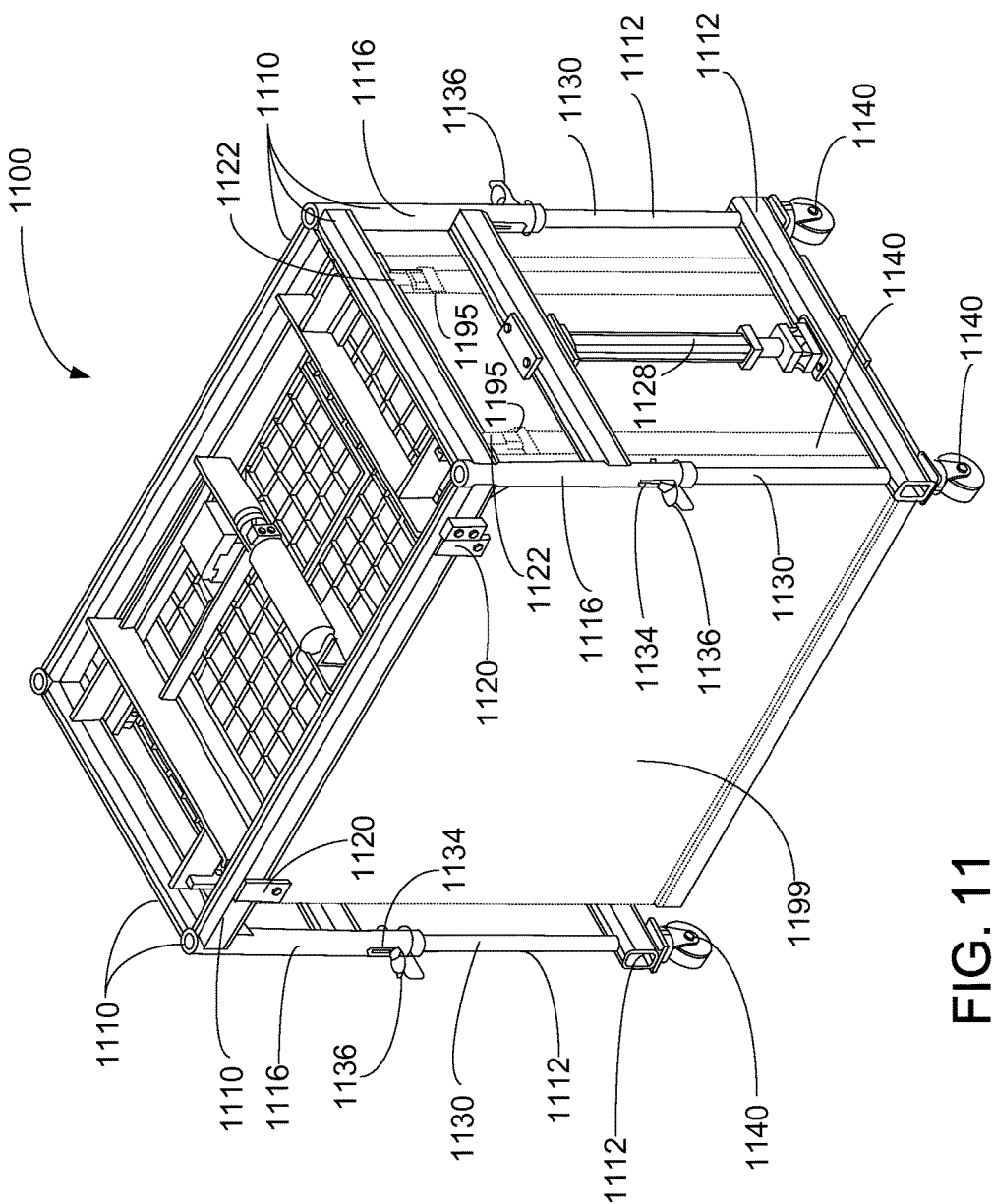
FIG. 11 illustrates a perspective view of one embodiment of the catalyst loading device of the present disclosure straddling catalyst blocks for loading and unloading.

Referring to FIG. 11, the catalyst loading device 1100 straddles over the top of the catalyst blocks 1199, which would be located between structural members 1116 and 1130. The catalyst blocks 1199 are coupled to the catalyst loading device via the multiple lifting lugs 1195 on the catalyst blocks 1199 and the corresponding lifting lugs 1122 on the catalyst loading device 1100. In another embodiment of the present invention, the other lifting lugs 1120 may be used to couple the catalyst blocks 1199 to the catalyst loading device 1100 via corresponding lugs on the catalyst blocks 1199. The catalyst loading device and lifting mechanism can be designed to straddle the catalyst blocks in either their width (short) or length (long) dimension based on the requirements of the SCR device and equipment or component arrangement.

The present invention facilitates movement of catalyst blocks in an SCR. The catalyst loading device is maneuvered into place over the catalyst blocks and removably coupled to the catalyst blocks for loading and unloading of the blocks in an SCR device.

Referring to FIG. 11, catalyst loading device 1100 moves into place via wheels 1140 in guide tracks on the top flange surface of the structural support frame (not shown) straddling catalyst blocks 1199 between structural members 1116 and 1130. The upper lifting frame 1110 is positioned to a desired height via the spacer 1128 (or spacer 848 per FIG. 8) design. Catalyst blocks 1199 are then coupled to the catalyst loading device 1100 via the four lifting lugs 1195 on the catalyst blocks and the four lifting lugs 1122 on the catalyst loading device 1100.

Now referring to FIGS. 4 and 11, in order to lift the catalyst blocks 1199, switch 468 is operated to provide power from the power supply 444 to drive the motor 446 to operate the hydraulic pump 442. The hydraulic pump 442 provides pressure to a hydraulic cylinder 438, wherein the application of force by the hydraulic cylinder 438 displaces a spacer 428 vertically, causing it to vertically raise the upper lifting frame 1110 attached thereto, thereby lifting the catalyst block 1199 coupled to the upper lifting frame 1110.

Once the catalyst blocks 1199 are moved into position in the SCR device, the pressure exerted by hydraulic pump 442 may be released, permitting the hydraulic cylinders 438 to retract. This lowers the spacer 428 and the upper lifting frame 1110 attached thereto. Catalyst blocks 1199 are decoupled from upper lifting frame 1110 once they are in a desired position. The catalyst loading device 400, 1100 allows the catalyst blocks 1199 to be set directly in place without the use of a pry bar, thereby minimizing the chance of personal injury.

The embodiments depicted in FIGS. 1-11 are intended to illustrate in a non-limiting way to the ordinarily skilled artisan the breadth and scope of potential various embodiments of the present invention that may be adapted to various SCR devices and catalyst block designs. Accordingly, other various embodiments are envisioned, such as, the alternative method of attaching lifting lugs 420 to the front side 402 and back side 404 of the catalyst loading device 400 on the upper lifting frame 1110 in lieu of lifting lugs 1122. In another embodiment envisioned, the hydraulic cylinders may be offset with respect to one another instead of directly opposite and in line with one another. For example, one hydraulic cylinder may be mounted towards the front side of the catalyst loading device, while the other is mounted towards the back side of the catalyst loading device. In yet another embodiment envisioned, multiple lifting mechanisms may be employed, each comprising single or multiple sets of hydraulic cylinders, hydraulic pumps, motors and batteries, etc.

Referring to FIGS. 6 and 8, in yet another embodiment of the present invention, spacer(s) 848 comprises telescoping structural members with holes and pins to allow for height adjustment of the upper lifting frame 810 of catalyst loading device 800 for different sizes and heights of catalyst blocks, similar to structural members 630 and 616 with holes 634 and pins 636. These structural members may be tubular members, but not limited thereto. In yet another embodiment, structural members 630 and 616 may be rigidly assembled structural members (i.e., not adjustable for height adjustment), and spacer(s) 848 may be telescoping structural members or tubes with holes and pins to allow for height adjustment of the upper lifting frame 810 of catalyst loading device 800 for different sizes and heights of catalyst blocks.

Figure 12:
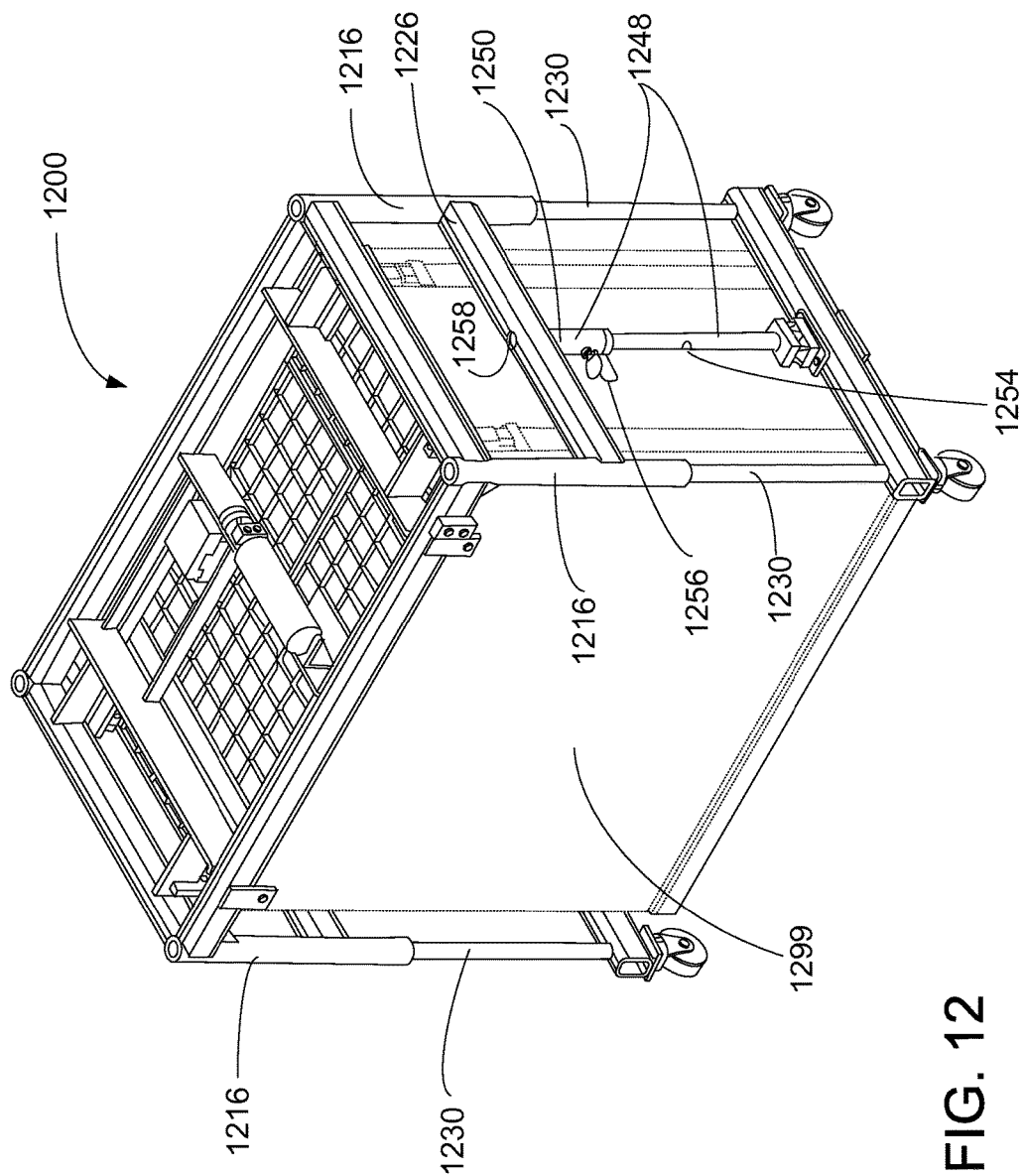
FIG. 12 illustrates a perspective view of another embodiment of the catalyst loading device of the present disclosure showing the spacer comprised of telescoping structural members with holes and pins straddling catalyst blocks for loading and unloading.

FIG. 12 shows an alternative embodiment where catalyst loading device 1200 is straddling catalyst block 1299 with the telescoping structural members 1252 and 1250 including holes 1254 and pin 1256 comprising spacer 1248 to allow for height adjustment of the upper lifting frame. Structural members 1216 and 1230 may also be telescoping to allow the upper lifting frame to move up and down for height adjustment. Further, upper support member 1226 may comprise hole 1258 to allow structural member 1252 to slide therethrough during height adjustment of the upper lifting frame (see also structural member 1052 in FIG. 10). In an alternative embodiment of the present invention, as shown in FIG. 11, the holes 1134 in structural members 1116 may be slotted, which allow pings 1136 to move up and down within the slotted holes as necessary for operation and manipulation of the catalyst loading device 1100.

In yet another embodiment of the present invention, catalyst loading device 800, 900 includes a spacer 848, 948 comprising telescoping structural members 850, 852, 950, 952 with holes 854, 954 and pins 856, 956.

In yet another embodiment of the present invention, the hydraulic cylinder 438 may be attached to the upper support member 426 instead of the lower support member 432.

The present invention is not intended to be limited to only the foregoing examples.

The present disclosure has been described with reference to exemplary embodiments, it will be understood that it is not intended that the present invention be limited thereto Obviously, modifications and alterations will occur to others upon reading and understanding the preceding detailed description. In some embodiments of the invention, certain features of the invention may sometimes be used to advantage without a corresponding use of the other features. It is intended that the present disclosure be construed as including all such modifications and alterations insofar as they come within the scope of the appended claims or the equivalents thereof.

The invention claimed is:

1. A device for loading and unloading catalyst blocks into a selective catalytic reactor (SCR) device, comprising:
   at least one lower support frame;
   an upper lifting frame comprising:
      horizontally oriented structural members attached to vertically oriented tubular structural members to form a rectangular or square shaped lifting frame;
      a horizontally oriented upper support member located between the tubular structural members and connected thereto on each end thereof;
   at least one hydraulic pump;
   at least one vertically oriented hydraulic cylinder fluidically connected to the at least one hydraulic pump and assembled to the lower support frame;
   at least one vertically oriented spacer attached to the at least one hydraulic cylinder and upper support member;
   a power supply; and
   a motor attached to the hydraulic pump and wired to the power supply to operate the hydraulic pump;
   wherein the upper lifting frame is movably engaged with respect to the lower support frame.

2. The device according to claim 1, wherein at least one lifting lug is assembled to the upper lifting frame for coupling catalyst blocks thereto.

3. The device according to claim 1, wherein at least one lifting lug is assembled to at least one structural member attached to the upper lifting frame for coupling catalyst blocks thereto.

4. The device according to claim 1, wherein the lower support frame further comprises:
   at least one horizontally oriented lower support member;
   vertically oriented structural members attached to the lower support member; and
   rotatable wheels attached to the lower support member.

5. The device according to claim 4, wherein the lower support frame further comprises:
   at least one hydraulic pump assembled to the lower support frame; at least one vertically oriented hydraulic cylinder fluidically connected to the at least one hydraulic pump and assembled to the upper lifting frame; at least one vertically oriented spacer attached to the at least one hydraulic cylinder and lower support frame; a power supply; and a motor attached to the hydraulic pump and wired to the power supply to operate the hydraulic pump.

6. The device according to claim 1, wherein the at least one spacer is interchangeable with various spacer designs for height adjustment of the upper lifting frame.

7. The device according to claim 1, wherein the at least one spacer comprises telescoping structural members with holes and pins to allow for height adjustment of the upper lifting frame of the catalyst loading device for different sizes and heights of catalyst blocks.

8. The device according to claim 1, further comprising a switch assembled to the catalyst loading device and wired to the power supply and to the motor for controlling the operation of the hydraulic pump to raise and lower the upper lifting frame;
   wherein the motor is an electric motor; and
   wherein the hydraulic pump is electrically operated by the electric motor connected to the power supply.

9. The device according to claim 5, wherein the at least one spacer is interchangeable with various spacer designs for height adjustment of the upper lifting frame.

10. The device according to claim 5, wherein the at least one spacer comprises telescoping structural members with holes and pins to allow for height adjustment of the upper lifting frame of the catalyst loading device for different sizes and heights of catalyst blocks.

11. The device according to claim 5, further comprising a switch assembled to the catalyst loading device and wired to the power supply and to the motor for controlling the operation of the hydraulic pump to raise and lower the upper lifting frame;
   wherein the motor is an electric motor; and
   wherein the hydraulic pump is electrically operated by the electric motor connected to the power supply.

12. The device according to claim 8, wherein the switch is a manual push button switch with an up and down button that acts to transmit power from the power supply to drive the motor to operate the hydraulic pump.

13. The device according to claim 11, wherein the switch is a manual push button switch with an up and down button that acts to transmit power from the power supply to drive the motor to operate the hydraulic pump.

14. A lifting mechanism for loading and unloading catalyst blocks into a selective catalytic reactor (SCR) device, comprising:
   an upper lifting frame;
   at least one lifting lug assembled to the lifting frame for coupling catalyst blocks thereto; and
   at least one hydraulic pump; at least one vertically oriented hydraulic cylinder fluidically connected to the at least one hydraulic pump; at least one vertically oriented spacer attached to the at least one hydraulic cylinder; a power supply; and a motor attached to the hydraulic pump and wired to the power supply to operate the hydraulic pump.

15. The lifting mechanism according to claim 14, wherein the at least one spacer is interchangeable with various spacer designs for height adjustment for different sizes and heights of catalyst blocks.

16. The lifting mechanism according to claim 14, wherein the at least one spacer comprises telescoping structural members with holes and pins to allow for height adjustment for different sizes and heights of catalyst blocks.

17. The lifting mechanism according to claim 14, further comprising a switch wired to the power supply and to the motor for controlling the operation of lifting mechanism;
   wherein the motor is an electric motor; and
   wherein the hydraulic pump is electrically operated by an electric motor connected to a power supply.

18. The lifting mechanism according to claim 17, wherein the switch is a manual push button switch with an up and down button that acts to transmit power from the power supply to drive the motor to operate the hydraulic pump.

\* \* \* \* \*